United States Patent [19]

Ruch et al.

[11] Patent Number: 5,687,060

[45] Date of Patent: Nov. 11, 1997

[54] VERTICALLY ORIENTED DOCKING STATION APPARATUS FOR A PORTABLE COMPUTER

[75] Inventors: Mark H. Ruch, The Woodlands; Steven S. Homer, Houston, both of Tex.

[73] Assignee: Compaq Computer Corporation, Houston, Tex.

[21] Appl. No.: 664,681

[22] Filed: Jun. 17, 1996

[51] Int. Cl.⁶ .............................. G06F 1/16; H05K 7/10; H05K 7/16

[52] U.S. Cl. .............................................. 361/686

[58] Field of Search ...................... 248/917, 918, 248/133, 292.13; 211/170; 364/708.1; 361/683, 686; G06F 1/16

[56] References Cited

U.S. PATENT DOCUMENTS

| | | | |
|---|---|---|---|
| 5,187,645 | 2/1993 | Spalding et al. | 361/686 |
| 5,212,628 | 5/1993 | Bradbury | 361/683 |
| 5,408,382 | 4/1995 | Schultz et al. | 361/686 |
| 5,452,180 | 9/1995 | Register et al. | 361/686 |

FOREIGN PATENT DOCUMENTS

| | | | |
|---|---|---|---|
| 6-202760 | 7/1994 | Japan | G06F 1/16 |
| WO 94/00808 | 1/1994 | WIPO | G06F 1/16 |

OTHER PUBLICATIONS

"Tadpole P1000 Series Docking Station", Tadpole Technology, Inc. copyright 1995.
"Tadpole P1700 : 166 MHz workstation–class performance", Tadpole Technology, Inc. copyright 1996.

Primary Examiner—Michael W. Phillips
Attorney, Agent, or Firm—Konneker & Smith

[57] ABSTRACT

A specially designed stand structure is used to vertically support a docking station housing, and an associated portable computer removably coupled thereto, to substantially reduce the vertical footprint of the overall docking station system. The stand structure includes a base portion having a recessed area for receiving and supporting a section of the docking station housing, and a pivotally mounted vertical holding wall structure with a transverse lower receiving platform. The vertical holding wall structure is spaced apart from and faces a vertical guide surface of the docking station housing, with the platform extending toward the guide surface. When the vertically oriented portable computer is placed on the platform the weight of the computer thereon pivots the vertical wall structure toward the guide surface, and a horizontally adjustable section of the vertical wall structure engages the facing vertical side of the computer and presses the opposite vertical side thereof against the guide surface to thereby horizontally align the computer docking connector with the mating connector on the docking station housing as the computer is pushed toward the docking station connector. The platform is spring-supported in a manner permitting vertical computer/docking station connector misalignments to be compensated for, and to relieve vertical stress on the mated computer and docking station connectors.

28 Claims, 10 Drawing Sheets

VERTICALLY ORIENTED DOCKING STATION APPARATUS FOR A PORTABLE COMPUTER

BACKGROUND OF THE INVENTION

1. Field of the Invention

The present invention generally relates to electronic apparatus, and more particularly relates to docking station apparatus used to connect a portable computer to desktop computer peripheral devices such as a keyboard, monitor, printer and mouse.

2. Description of Related Art

In computer parlance a "docking station" is an interface device to which a portable computer, such as the increasingly popular notebook computer, may be operatively and removably coupled to connect its central processing unit and other internal circuitry to desktop computer peripheral devices such as a keyboard, monitor, printer and mouse. In this manner the portable computer may be used "on the road" by its owner, utilizing its own keyboard, monitor and mouse, and later used in a home or office desktop work station in conjunction with the larger desktop peripheral devices. Thus, a single computer can provide its user with both the compactness, light weight, portability and diminutive work space requirements of the notebook computer and the power and comfort of a desktop system with its larger work space and peripheral devices.

A conventionally configured docking station typically comprises a housing adapted to sit atop the desktop work space and containing the interface electronics used to connect the "docked" portable computer to the desktop peripheral devices operatively coupled to the docking station. The housing has a horizontal surface upon which the portable computer is rested, keyboard side up, before being horizontally moved rearwardly to removably couple a connector on the rear side of the computer to a corresponding docking connector on the docking station housing.

This horizontal orientation of the docking station is similar to that of the typical desktop computer in that it presents generally the same disadvantage—namely, its vertical footprint occupies a substantial desktop workspace area. With a desktop computer this problem may be substantially alleviated by configuring the computer to be vertically oriented in the now familiar "tower" configuration in which the desktop computer is basically tipped ninety degrees so that it is vertically elongated and rests on what used to be one of its relatively short vertical sides. In this vertical tower configuration the desktop computer may be positioned on the desktop, and occupy a substantially lesser horizontal portion of the work area, or placed on the floor to one side of or under the desk to conveniently eliminate the computer's desktop space requirement.

In order to achieve a similar kind of desktop work area space savings in a docking station application it would be desirable to provide a docking station system that could vertically orient a portable computer docked therein in a manner correspondingly reducing the vertical footprint of the overall docking station apparatus. It is accordingly an object of the present invention to provide such a space-saving docking station system.

SUMMARY OF THE INVENTION

In carrying out principles of the present invention, in accordance with a preferred overall system embodiment thereof, space-saving computer docking apparatus is provided that comprises a specially designed stand structure, a docking station, and a portable computer, preferably a notebook computer.

The docking station has a bottom side, an electrical connector, and a guide structure upwardly spaced apart from and generally parallel to the bottom docking station side and along which the portable computer may be moved into docked coupling with the electrical connector.

The stand structure is configured to operatively support the docking station in an orientation in which its bottom side and guide structure are vertically oriented, and has a receiving portion upon which the portable computer, in a vertical orientation, may be placed; and a holding portion movable in response to placement of the vertically oriented portable computer on the receiving portion to engage the vertically oriented portable computer and hold it against the docking station guide structure for horizontal movement therealong into docked coupling with the docking station electrical connector.

According to one feature of the invention the holding portion includes a vertically oriented holding wall structure pivotally secured to a base portion of the stand structure for pivotal movement toward and away from the guide structure of the vertically supported docking station between an outwardly pivoted receiving position and an inwardly pivoted receiving position. The receiving portion is generally horizontally oriented and is transversely secured to a lower portion of the vertically oriented holding wall structure for pivotal movement therewith relative to the stand structure base portion.

When the vertically oriented portable computer is placed on the receiving portion with the holding wall structure in its outwardly pivoted receiving position, the weight of the computer automatically pivots the holding wall structure toward the docking station guide structure and to the support position of the holding wall structure. This, in turn, causes the holding wall structure to engage the portable computer and hold it against the vertically oriented docking station guide structure. Accordingly, the holding wall structure automatically maintains the computer in horizontal alignment with the docking station electrical connector, while the receiving portion holds the computer in vertical alignment therewith, to permit the vertically oriented portable computer to be moved horizontally along the guide structure into docked coupling with the docking station electrical connector.

According to another feature of the invention, the holding wall structure is provided with a horizontally adjustable portion that permits selective variation of the minimum horizontal distance between the holding wall structure and the vertically oriented guide structure, whereby vertically oriented portable computers of varying horizontal widths may be accommodated by the stand structure.

In a preferred embodiment of this horizontal width adjustment feature the holding wall structure includes a vertically oriented hollow body portion with an inner side that faces the guide structure, is horizontally spaced apart therefrom, and has an opening therein. The adjustable portion is an adjustment member supported within the body portion interior for movement therein to various releasably lockable positions in which a curved side surface portion of the adjustment member projects outwardly through the opening a selectively variable distance outwardly beyond the inner side of the body portion.

According to a further feature of the invention, the receiving portion has a vertically movable top side platform portion upon which the vertically oriented portable computer may be placed. The platform is interconnected to the stand structure base portion by springs that resiliently bias the holding wall structure to its outwardly pivoted receiving position, and resiliently bias the platform portion toward an upper limit position thereof. This spring-supported platform portion serves to permit a vertical deflection thereof to compensate for small vertical misalignments between the vertically oriented portable computer and the docking station electrical connector.

DETAILED DESCRIPTION

Figure 6:
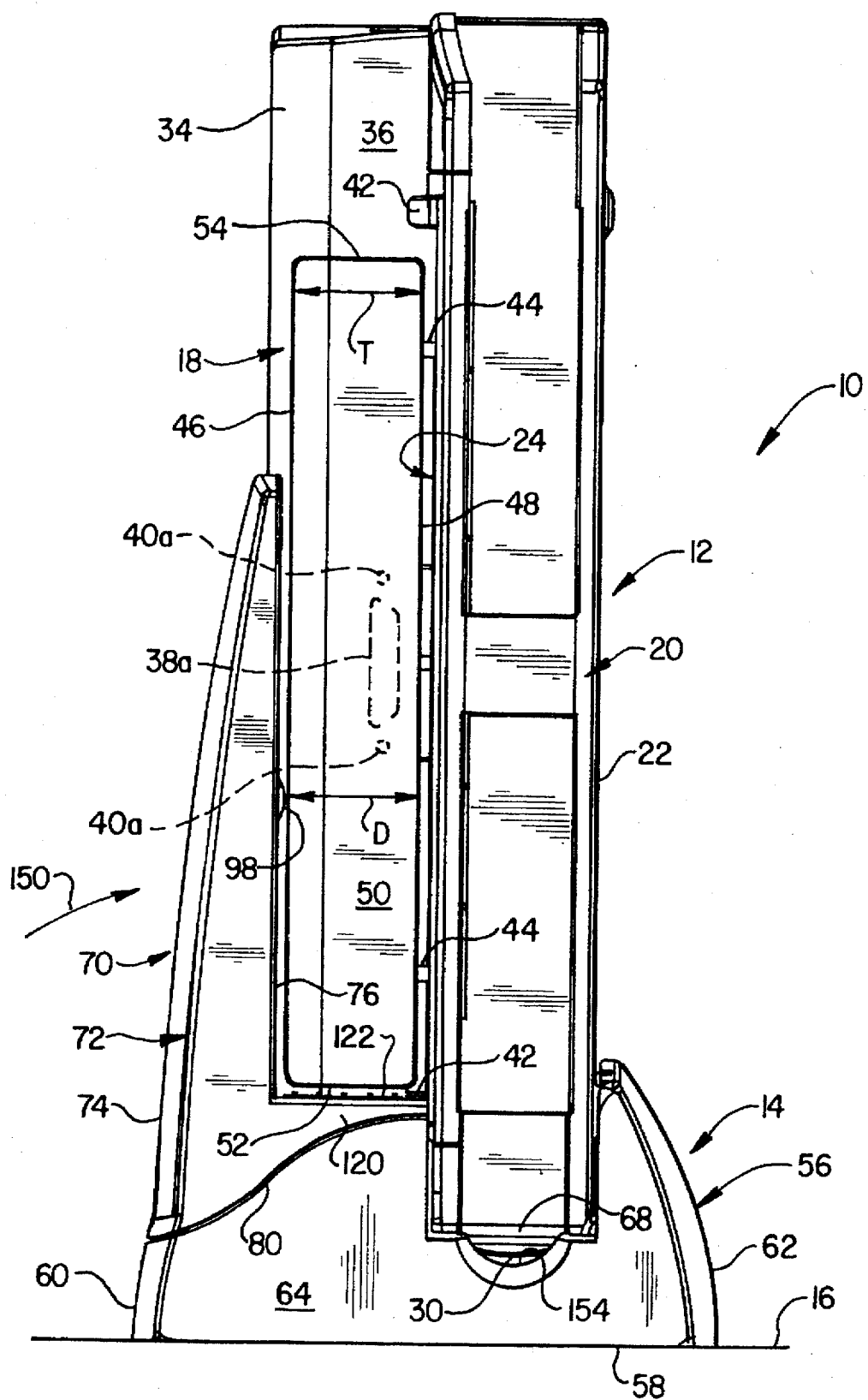
FIG. 6 is a view similar to that in FIG. 5, but with a representative portable computer being operatively supported in the stand, with the vertical stand holding wall being pivoted inwardly against the vertical top side of the computer, and the computer being operatively coupled to the vertically oriented docking station.

Referring initially to FIG. 6, the present invention provides a specially designed docking station system 10 that basically comprises three components—a docking station 12 operative to create an interface connection through which a portable computer may be operatively coupled to desktop peripheral devices (not shown) such as a keyboard, monitor, printer and mouse; a stand structure 14 positionable on a horizontal support surface 16 such as a desktop or floor and operative to support the docking station 12 in a vertical orientation; and a portable computer 18, representatively a notebook computer, supportable vertically between portions of the docking station 12 and the stand 14, as later described, and removably connectable to the docking station 12 in a manner coupling the computer to the docking station's associated peripheral devices.

Figure 4:
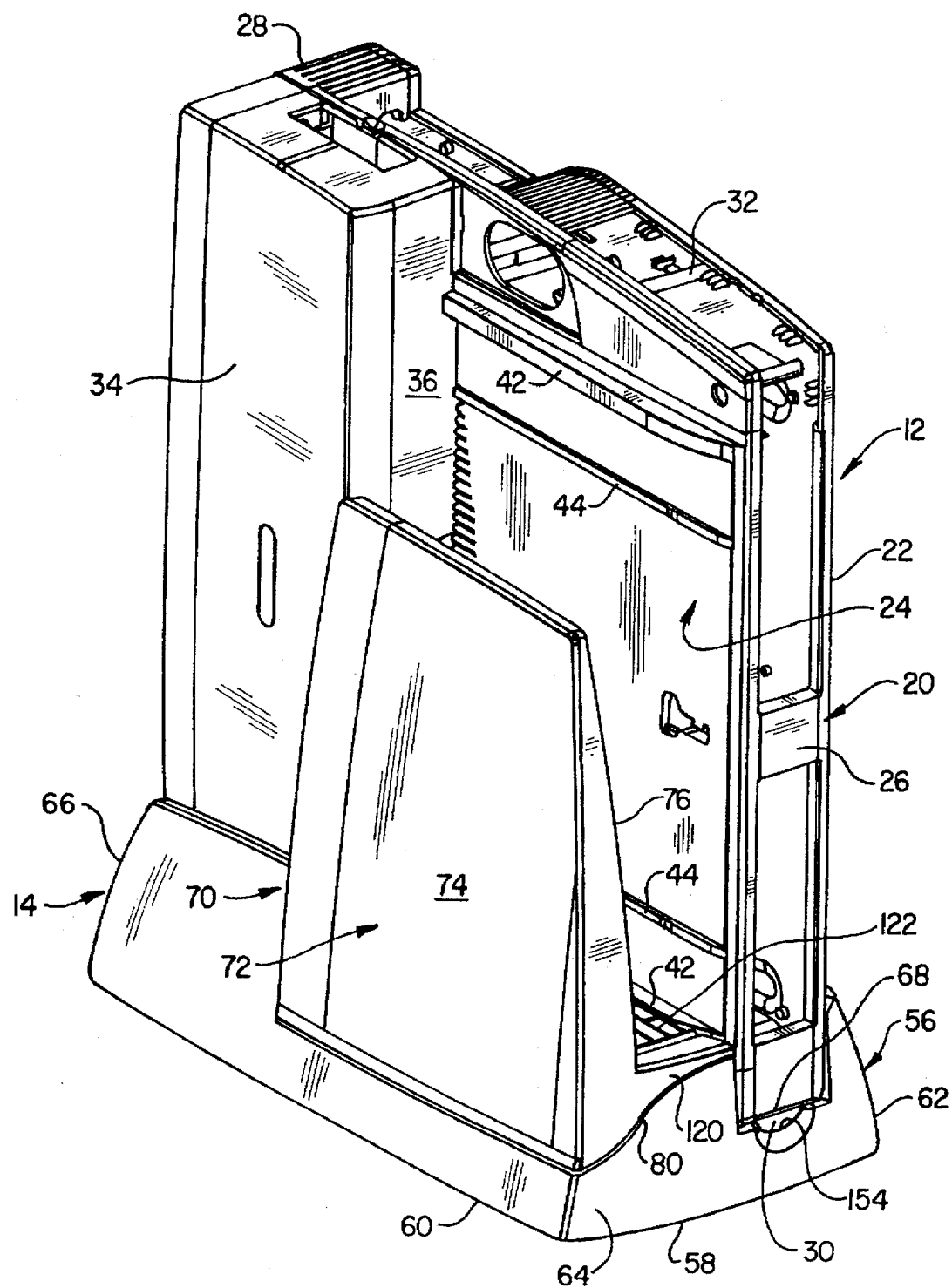
FIG. 4 is a front end perspective view of the stand operatively supporting a representative docking station in a vertical orientation, with the vertical holding wall portion of the stand being in its inwardly pivoted support position.
Figure 5:
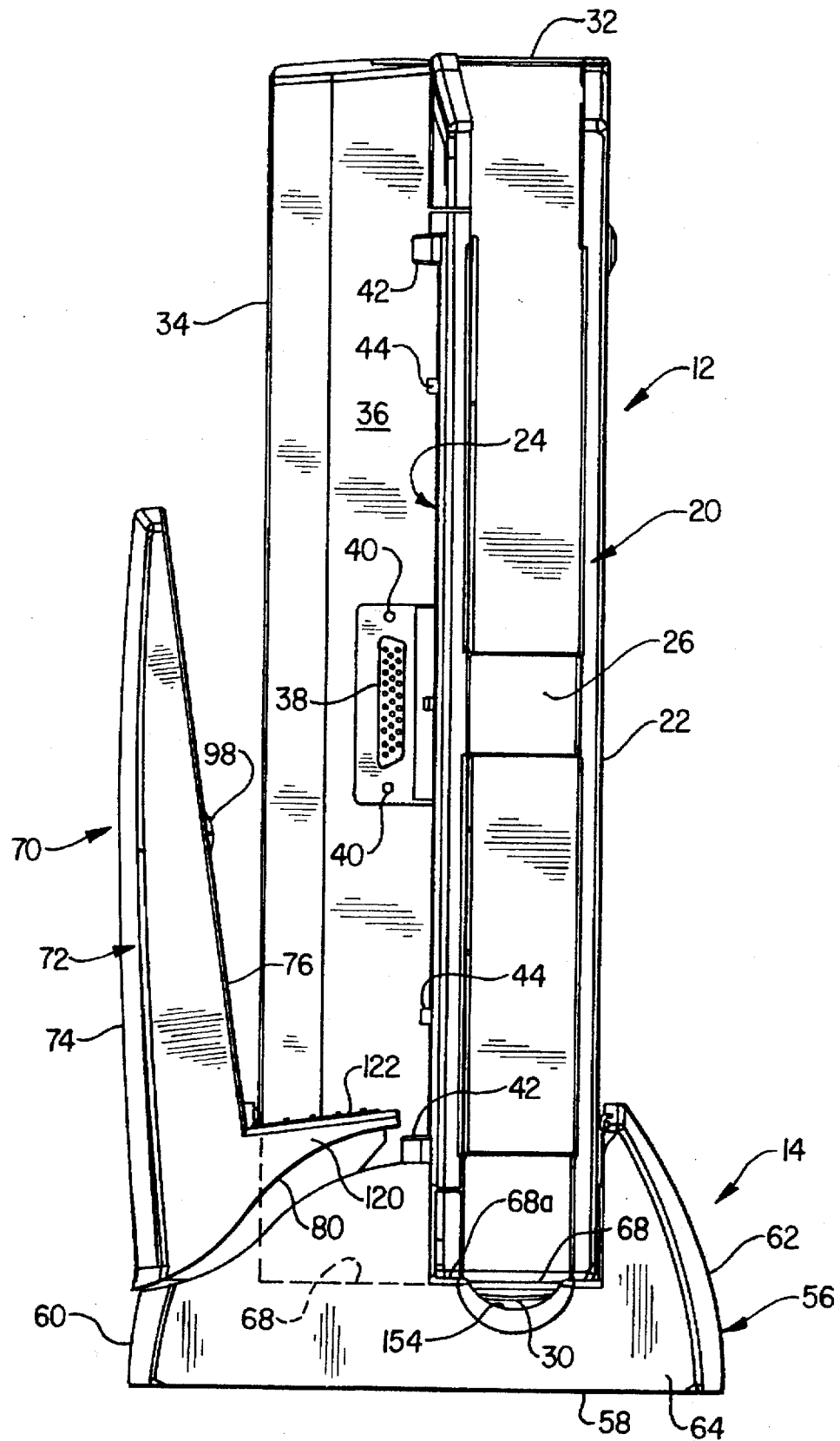
FIG. 5 is an enlarged scale front end elevational view of the stand vertically supporting the docking station, with the vertical holding wall portion of the stand being in its outwardly pivoted receiving position.

The docking station 12, as best illustrated in FIGS. 4–6, includes a housing 20 within which the computer/peripheral device coupling electronics are disposed. Housing 20 has a rectangular base portion with a bottom side 22 adapted to rest on a horizontal support surface when the docking station is in its normal horizontal orientation, a top side guide structure generally denoted by the reference numeral 24, a front side 26, a rear side 28, opposite left and right sides 30 and 32, and an upstanding rectangular rear portion 34.

Rear housing portion 34 has a front side wall 36 upon which a connector 38 (see FIG. 5) and an associated pair of outwardly projecting guide pins 40 are mounted. Connector 38 is operatively connected to the internal interface electronics (not shown) disposed within the housing 20. The top side guide structure 24 of the docking station 12 has a spaced pair of upstanding guide ribs 42 on opposite sides thereof, and a spaced pair of smaller upstanding support ribs 44 positioned between the ribs 42.

Turning now to FIG. 6, the notebook computer 18 is shown in simplified form in its closed orientation and has a top side 46, a bottom side 48, a front side 50, and left and right sides 52 and 54. On the back side of the notebook computer 18, and shown in phantom in FIG. 6, is a connector 38a, and an associated pair of guide pin receiving holes 40a that respectively mate with their associated connector 38 and guide pins 40 (see FIG. 5) when the computer 18 is operatively "docked" to the docking station 12.

With the docking station 12 removed from its supporting stand 14 and in its horizontal orientation (i.e., with the bottom side 22 of the docking station housing 20 resting, for example, on the horizontal support surface 16, the computer 18 is docked by placing its bottom side 48 against the upstanding guide structure ribs 44, with the computer side 52 slidingly engaging and being vertically aligned with the front side surface 36 by the lower side rib 42. The computer 18 is then moved rearwardly to removably mate the connectors 38,38a.

As previously mentioned, the stand structure 14 supports the docking station 12 and the notebook computer 18 in their FIG. 6 vertical orientations relative to the horizontal support surface 16 and, in a manner subsequently described herein, facilitates the operative docking of the computer 18 in its vertical orientation. With reference now to FIGS. 1–6, the stand structure 14 includes a base portion 56 having a bottom side 58, left and right upstanding side portions 60 and 62, and opposite front and rear ends 64 and 66. The top side of the stand structure base portion 56 has a generally L-shaped recess 68 formed therein and configured to complementarily receive a left side portion of the vertically oriented docking station housing 20 (see FIGS. 4–6).

The stand structure 14 also includes a vertical holding wall structure 70 operative in a manner subsequently described to engage the computer 18 and hold its vertically oriented bottom side 48 slidably against the guide ribs 44 of the guide structure 24 to facilitate the alignment of the docking station and computer connectors 38,38a during horizontal docking of the vertically oriented computer 18.

As illustrated in FIGS. 1–8, the vertical holding wall structure 70 includes a hollow, vertically oriented outer wall portion 72 having, as viewed in these drawing figures, a left or outer side 74, a right or inner side 76 having an opening 78 therein, and a curved bottom side 80. Depending from the bottom side of the hollow outer wall portion 70 are a pair of generally triangularly shaped support portions 82 (see FIGS. 2 and 11) spaced apart in a front-to-rear direction relative to the stand 14. At the bottom apex end of each of the support portions 82 is an outwardly projecting cylindrical mounting projection 84.

The bottom end of the outer wall portion 72 is positioned atop a left front end portion of the stand structure base portion 56, with the triangular support portions 82 extending down into the interior of the base portion 56. Cylindrical mounting projections 84 are slidably received and supported in the arcuate bottom end portions (see FIG. 2) of generally J-shaped cradle sections 86 formed in the interior of the stand structure base portion 56. This supports the outer wall portion 72 on the stand base portion 56 for pivotal movement relative thereto, about a horizontal front-to-rear extending axis, between an outwardly pivoted receiving position (see FIGS. 2 and 5) and an inwardly pivoted support position (see FIGS. 1, 3, 4 and 6). As illustrated in FIG. 2, upwardly projecting portions 86a of the cradle sections 86 act as stop surfaces for sides 82a of the triangular support portions 82 to limit the outward pivoting of the outer wall portion 72 relative to the stand structure base portion 56.

Turning now to FIGS. 1 and 7–9, the vertical holding wall structure 70 also includes an adjustment member 88 movably supported within the interior of the outer wall portion 72. The adjustment member 88 has a generally flat upper portion 90 with inner and outer sides 92 and 94, a curved upper end 96, and a laterally enlarged lower portion with an outwardly curved outer side surface 98. A cutout area 100 is formed in the member 88 and is used to facilitate the adjustment of the member 88 relative to the outer wall portion 72 in a manner subsequently described herein, and a position indicating line 102 is suitably formed on the front side of the member 88 for purposes later described herein. At the lower end of the adjustment member 88 are a spaced pair of mounting pin projections 104.

Figure 7:
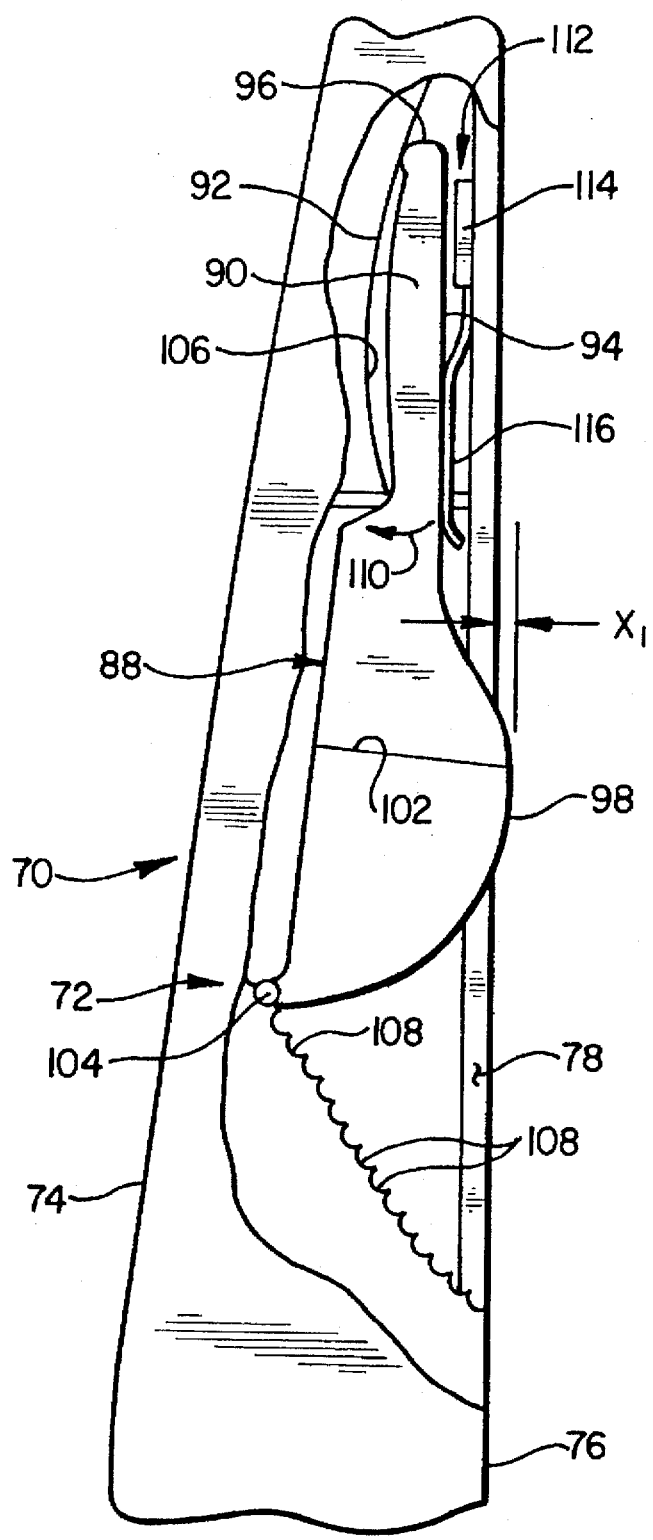
FIG. 7 is an enlarged scale, partially cut away front side elevational view of a vertical length of the pivotable holding wall illustrating a horizontal adjustment wall section thereof in a retracted orientation thereof.
Figure 8:
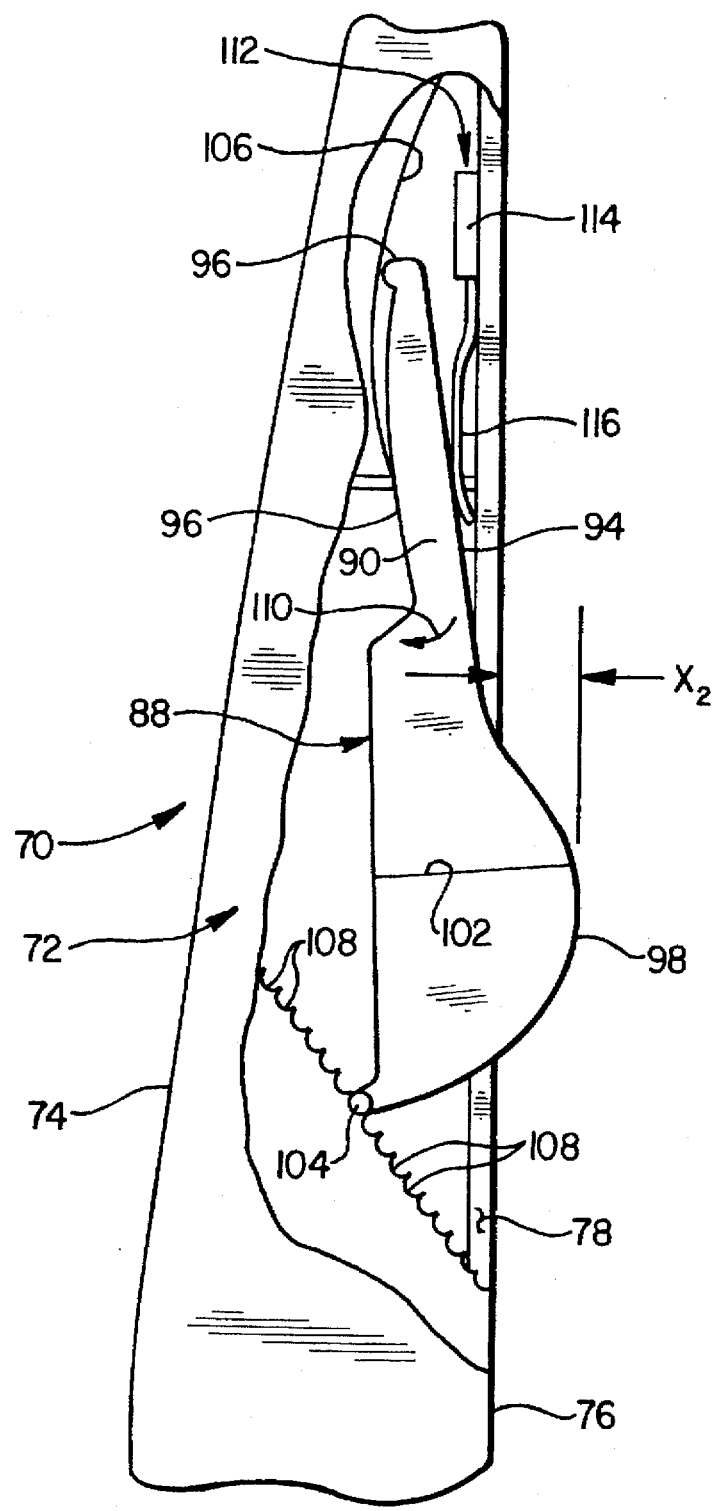
FIG. 8 is a view similar to that in FIG. 7, but with the horizontal adjustment wall section in an extended orientation thereof.
Figure 9:
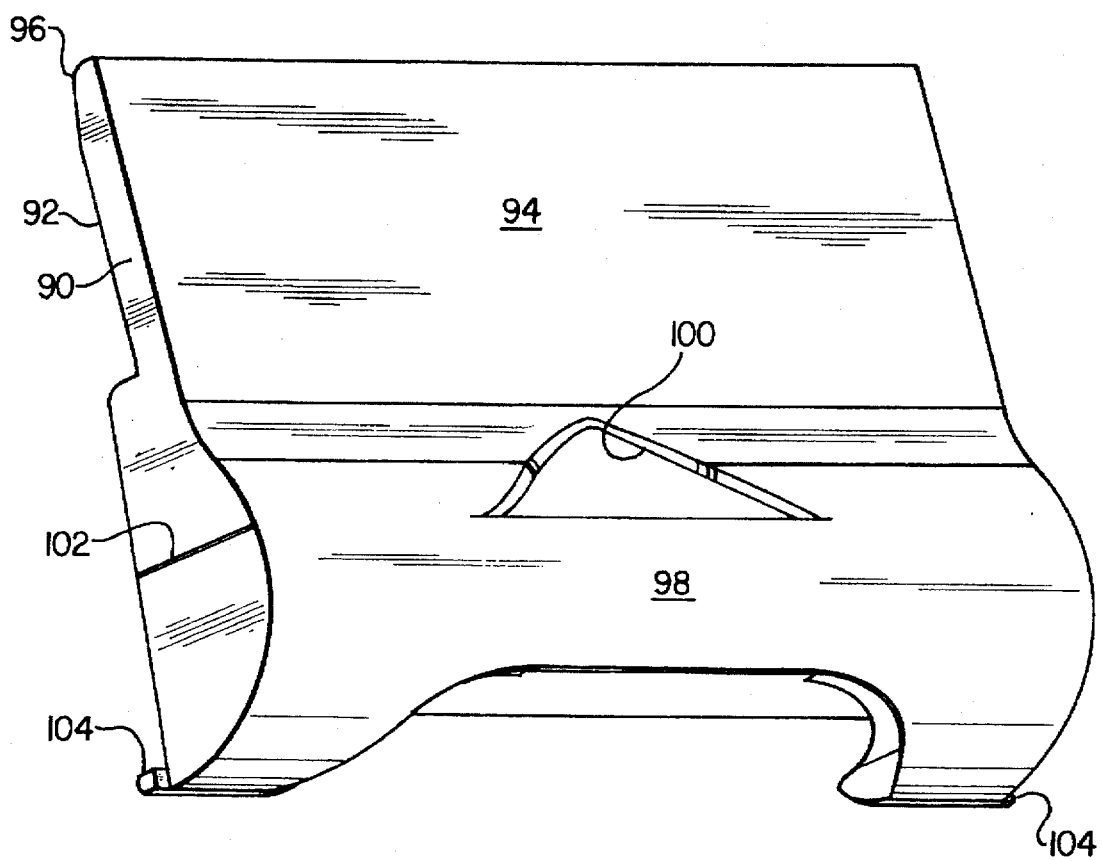
FIG. 9 is an enlarged perspective view of the horizontal adjustment wall section removed from the vertical holding wall portion of the stand.

As best illustrated in FIGS. 7 and 8, the adjusting member 88 is received within the interior of the hollow outer wall portion 72, with the curved outer side surface 98 of the member 88 being vertically aligned with the outer wall portion opening 78, the curved upper end 96 of the member 88 slidingly engaging a rightwardly convex arcuate surface 106 formed along a left interior side portion of the outer wall portion 72, and each of the mounting pin projections 104 being received in one of the arcuate depressions 108 in opposed series thereof disposed in front and rear interior side portions of the outer wall portion 72 and stairstepped in a downwardly and rightly sloped orientation as viewed in FIGS. 7 and 8.

Figure 10:
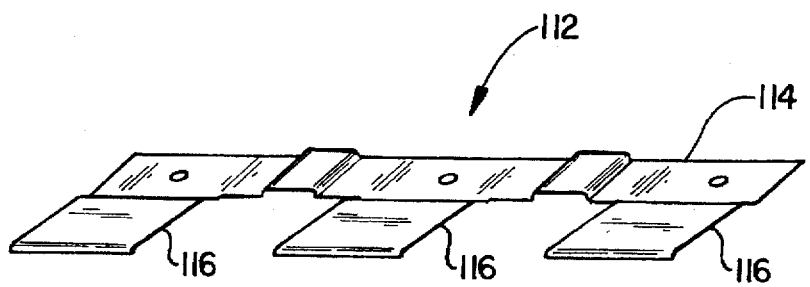
FIG. 10 is an enlarged perspective view of a biasing spring structure removed from the vertical holding wall portion of the stand.

Referring now to FIGS. 7, 8 and 10, the adjustment member 88 is resiliently biased in a clockwise direction (as indicated by the arrow 110 in FIGS. 7 and 8) by a spring structure 112 having an elongated rectangular body portion 114 from which three spaced apart leaf spring portions 116 transversely project. The spring body portion 114 is suitably secured within an upper interior end section of the outer wall portion 72, with the leaf spring portions 116 resiliently bearing against the outer side 94 of the upper portion 90 of the adjustment member 88, thereby maintaining on the adjustment member 88 the resilient clockwise pivotal biasing force indicated by the arrow 110 in FIGS. 7 and 8.

With the mounting pin projections 104 in upper ones of the arcuate depressions 108 (see FIG. 7), the curved side surface 98 of the adjustment member 88 projects outwardly through the opening 78 in the inner side 76 of the outer wall portion 72 a horizontal distance $X_1$. However, by grasping the enlarged lower portion of the adjustment member 88, pivoting it in a counterclockwise direction to free its pin portions 104 from their receiving depressions 108 shown in FIG. 7, and then lowering the adjustment member 88 and placing its pins 104 in a lower pair of arcuate depressions 108 (as shown in FIG. 8), the horizontal projection distance $X_1$ of the curved adjustment member surface 98 rightwardly beyond the wall portion surface 76 may be increased to $X_2$ for purposes later described.

The clockwise biasing force 110 of the spring structure 112 on the adjusting member 88 serves to resiliently retain the pins 104 in their new set of arcuate depressions 108 until a subsequent repositioning of the adjustment member 88 is desired. A visual indication of the selected outward projection distance X of the curved adjustment member surface 98 is conveniently provided by the alignment of the position indicating line 102 (see FIGS. 7 and 8) on the adjustment member 88 with one of a series of horizontal projection distance indicating lines 118 (see FIG. 1) suitably formed on the inner side 76 of the outer wall portion 72.

Figure 1:
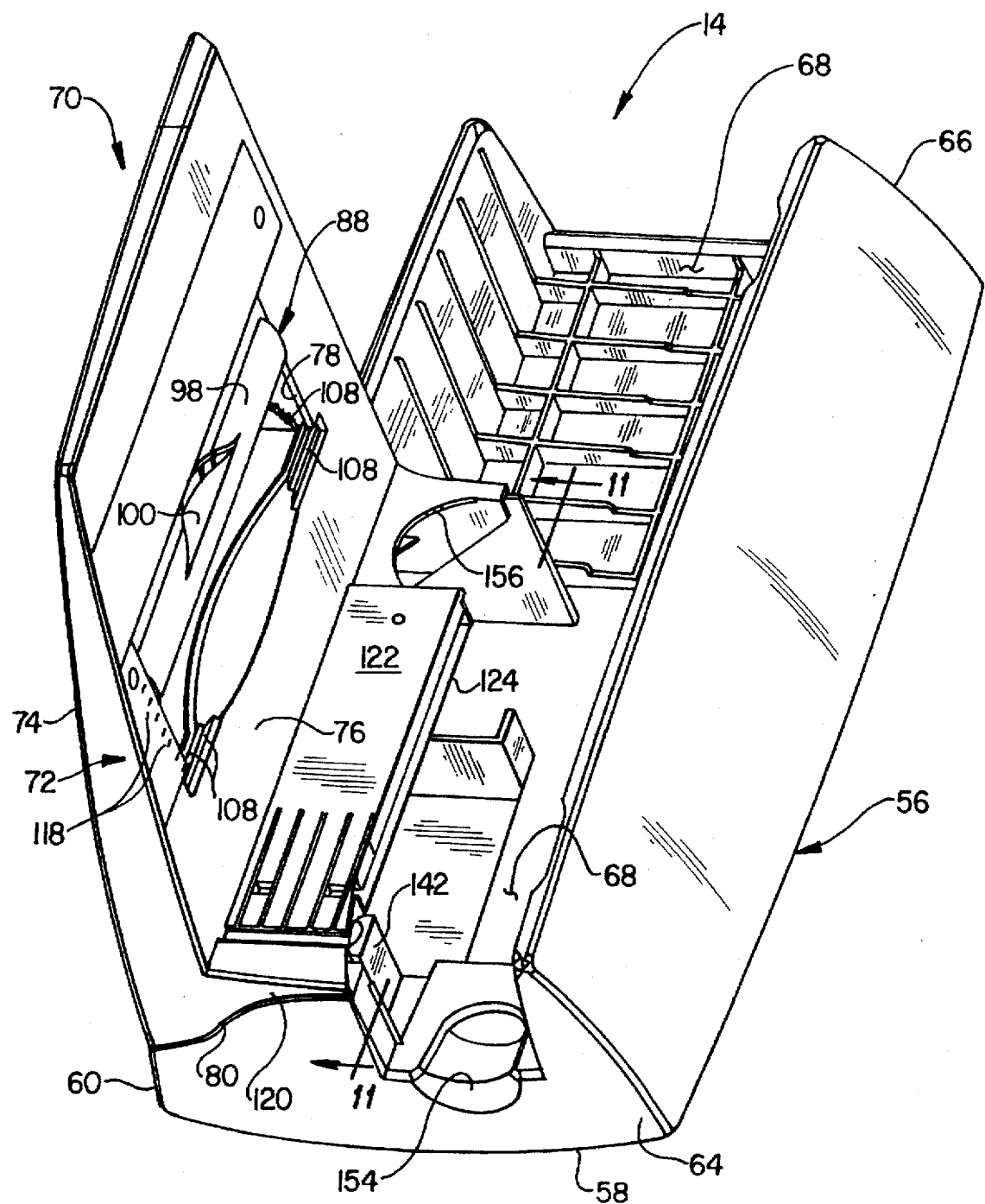
FIG. 1 is a front end perspective view of a specially designed docking station stand embodying principles of the present invention and operative to support a portable computer docking station in a vertical orientation.
Figure 2:
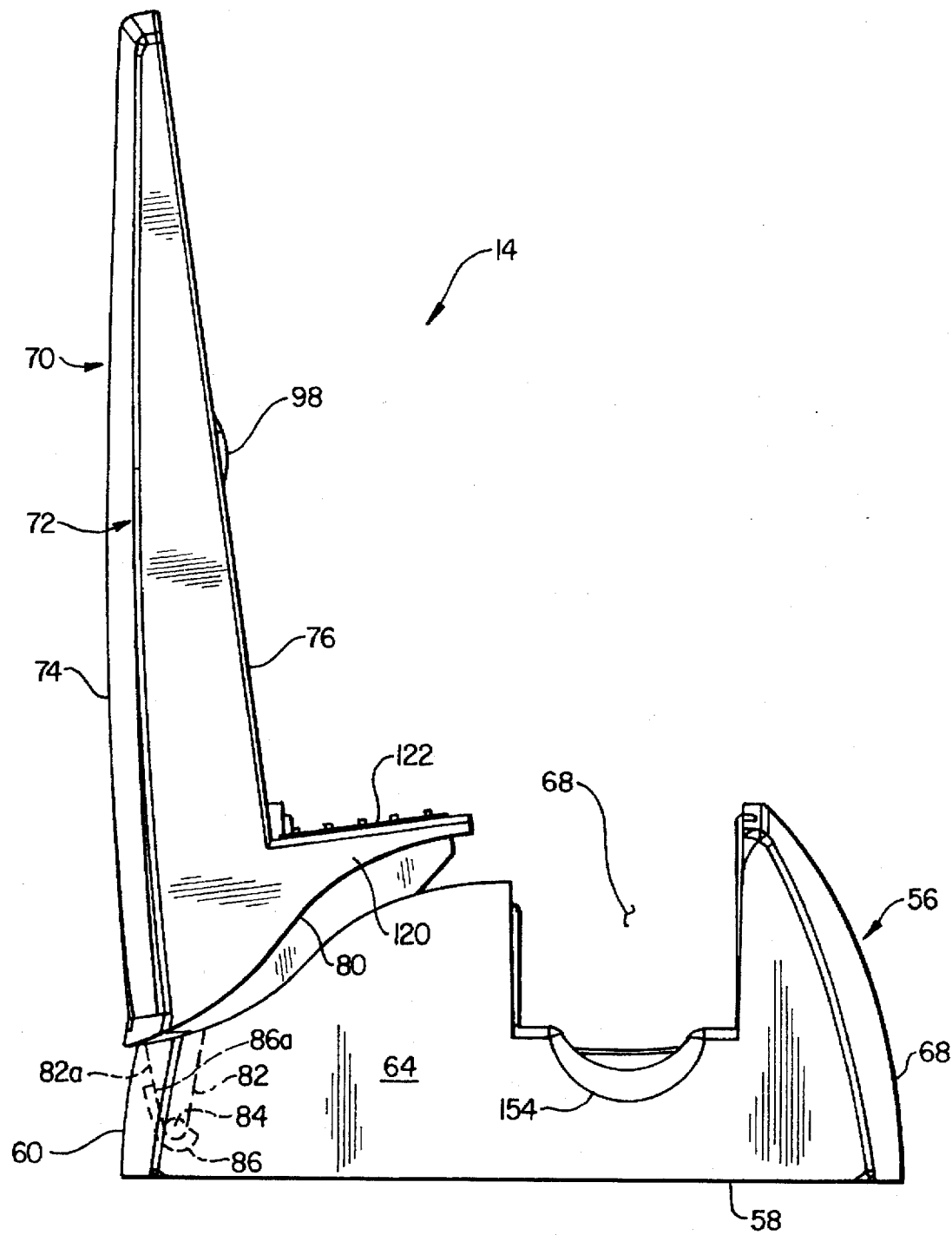
FIG. 2 is an enlarged scale front end elevational view of the stand, with a vertical computer holding wall portion of the stand in an outwardly pivoted receiving position thereof.
Figure 3:
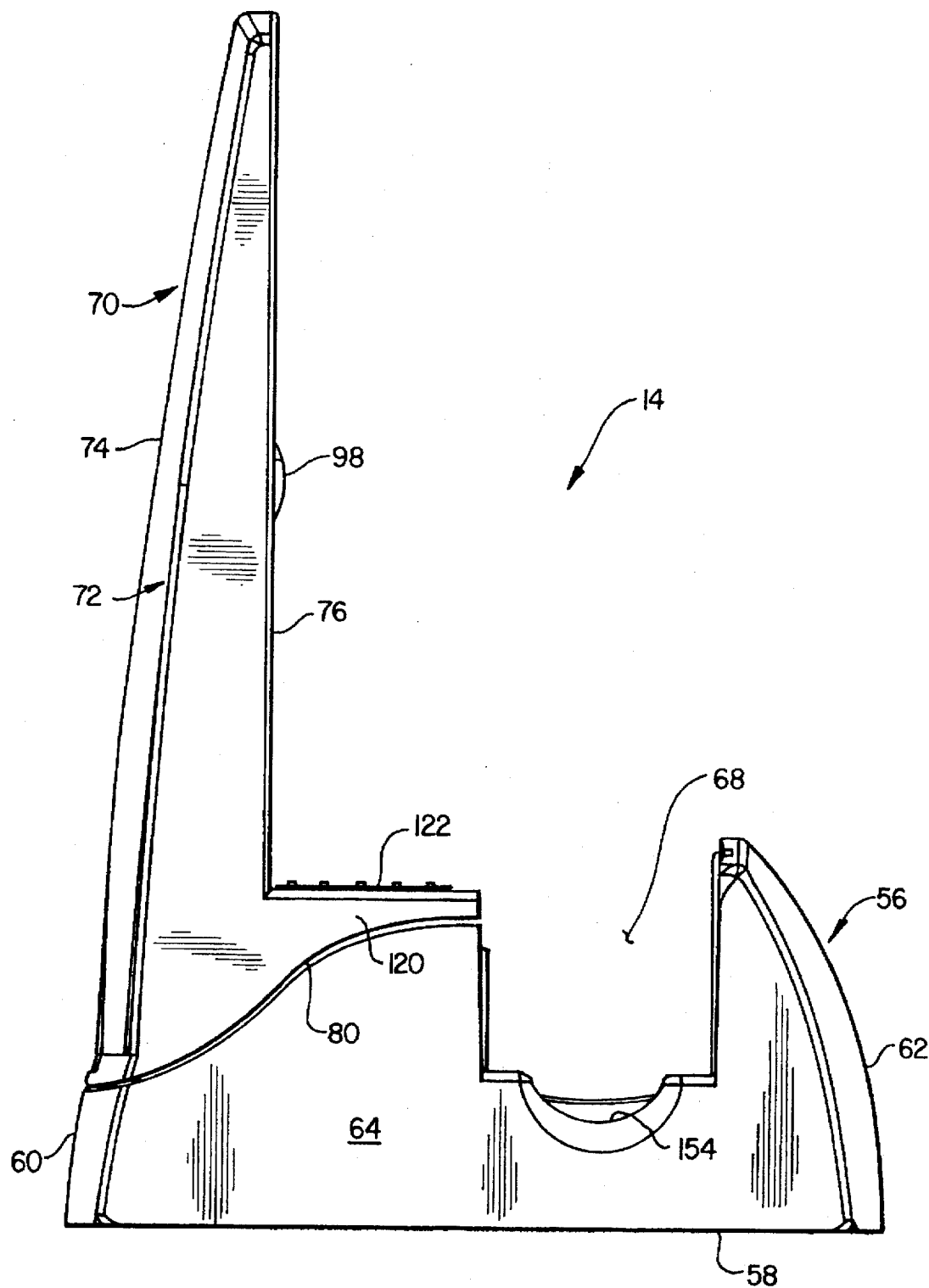
FIG. 3 is a view similar to that in FIG. 2, but with the vertical holding wall portion of the stand in an inwardly pivoted support position thereof.
Figure 11:
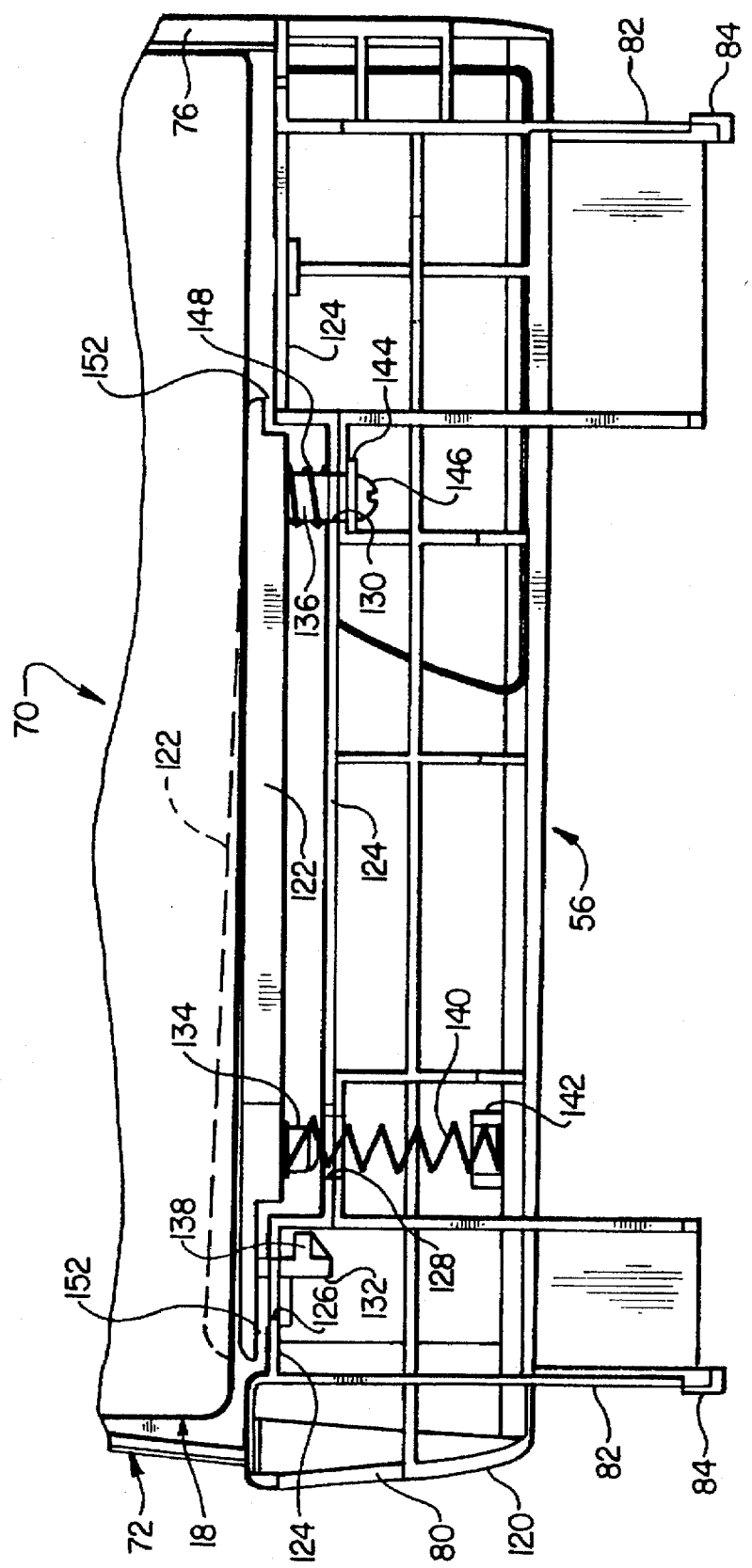
FIG. 11 is an enlarged inner side edge elevational view of a specially designed, spring-biased support platform portion of the stand, with a representative portable computer operatively supported thereon.

Referring now to FIGS. 1 and 11, the vertical holding wall structure 70 further includes a transverse lower end portion 120 that projects from a bottom end section of the outer wall portion 72 toward the right side 62 of the stand structure base portion 56. A rectangular receiving platform 122, atop which the vertically oriented portable computer 18 may be placed, is elongated in a front-to-rear direction relative to the stand structure base portion 56, is positioned atop the transverse lower end portion 120, and overlies a horizontally oriented rib portion 124 thereof.

Rib portion 124 has, from left to right as viewed in FIG. 11, vertically extending openings 126, 128 and 130 formed therein. Formed on the underside of the platform 122, also from left to right as viewed in FIG. 11, are projections 132, 134 and 136 that are respectively aligned with the rib openings 126, 128 and 130. Projection 132 extends downwardly through the rib opening 126 and has a horizontal catch portion 132 that underlies a facing bottom side surface portion of the rib 124 and limits the upward travel of a front end portion of the platform 122 relative to the rib 124.

Projection 134 has a cylindrical configuration and is received in an upper end portion of a coiled, preloaded compression spring 140 that extends downwardly through the rib opening 128 and has a lower end portion thereof captively retained in an underlying tubular boss portion 142 of the stand structure base portion 56.

Projection 136 has a cylindrical configuration, extends downwardly through the rib opening 130, and has a diametrically enlarged washer 144 secured to its lower end by a screw 146. Washer 144 prevents the projection 136 from being pulled upwardly through the rib opening 130. A preloaded coiled compression spring 148 circumscribed the portion of the projection 136 disposed above the rib 124 and bears at its opposite ends against the underside of a right end portion of the platform 122 and a top side surface portion of the rib 124.

The springs 140, 148 resiliently bias the platform 122 toward its dotted line position in FIG. 11, at which point the projection catch portion 138 and the washer 144 upwardly bear against their associated underside portions of the rib 124. Spring 140 also acts to resiliently and pivotally bias the vertical outer wall portion toward its outwardly pivoted receiving position shown in FIGS. 2 and 5.

Using the specially designed stand structure 14 of the present invention, the notebook computer 18 is operatively coupled in a vertical orientation to the docking station 12 in the following representative manner. First, a left side portion of the docking station housing 20 is inserted into the complementarily configured top side recess 68 in the base portion 56 as shown in FIGS. 4 and 5, thereby orienting the docking station 12 in a position in which its bottom side 22 extends vertically and its now vertically oriented top side guide portion 24 faces the inner side 76 of the outer wall portion 72 of the vertical holding wall structure 70.

Next, as illustrated in FIG. 7 or 8, the curved side surface 98 of the adjustment member 88 is moved outwardly through the wall opening 78 a selected horizontal distance X corresponding to the desired horizontal distance D (see FIG. 6) between the adjusted surface 98 and the support ribs 44 when the outer wall portion 72 is in its FIG. 6 inwardly pivoted support position, the selected distance D being essentially equal to the thickness T of the vertically oriented notebook computer 18. A visual indicia of the selected distance D is conveniently provided by the particular one of the horizontal projection indicating lines 118 (see FIG. 1) with which the adjustment member position indicating line 102 (see FIGS. 7 and 8) is aligned. If desired, these first two steps may be reversed—i.e., the docking station 12 may be vertically supported in the stand structure 14 after the horizontal adjustment of the adjustment member portion 88 of the vertical holding wall structure 70.

Next, with the vertical holding wall structure 72 in its outwardly spring-biased receiving position shown in FIGS. 2 and 5, the vertically oriented notebook computer 18 is moved, either horizontally or vertically, into the gap between the outer wall portion 72 and the docking station guide portion 24 and placed atop the platform 122 as shown in FIGS. 6 and 11. The weight of the notebook computer 18 exerted on the platform 122 does two things—(1) it downwardly deflects the platform 122 from its initial leftwardly and upwardly sloped dotted line position (as viewed in FIG. 11) to its solid line position in FIG. 11 against the resilient vertical forces of the springs 140 and 148, and (2) it automatically pivots the vertical holding wall structure 70 inwardly from its receiving position to its FIG. 6 support position as indicated by the arrow 150 in FIG. 6

The resilient partial downward deflection of the platform 122 by the weight of the vertically oriented notebook computer 18 thereon brings the computer connector 38a (see FIG. 6) into general vertical alignment with the corresponding docking station connector 38 (see FIG. 5) behind the computer connector 38a. Additionally, during the inward pivoting of the outer wall portion 72 of the vertical holding wall structure 70 the outwardly projecting curved adjustment member surface 98 engages the left vertical side of the notebook computer 18 (as viewed in FIG. 6) in a manner exerting, when the outer wall portion 72 reaches its FIG. 6 position, a rightward force on the computer and holding its vertical right side slidably against the docking station ribs 44 to thereby horizontally aligning the computer connector 38a with the corresponding docking station connector 38 behind it.

Finally, the vertically oriented notebook computer 18 is docked by moving it rearwardly toward the rear docking station housing portion 34 until the computer connector 38a is releasably mated with the docking station connector 38. As can be seen in FIG. 11, the weight of the computer 18 resting on the platform 122 only partially deflects a left or front portion of the platform downwardly toward the rib 124—there are still small vertical gaps between the front and rear ends of the platform 122 and underlying top side surface portions of the rib 124.

At the rear end of the platform 122 the gap 152 permits further resilient downward deflection of a rear end portion of the platform 122 if, for example, the computer connector 38a is slightly upwardly misaligned with the docking station connector 38 in which case the spring 148 permits a downward resilient deflection of a corresponding rear end portion of the computer 18 to bring about a precise vertical alignment of the connectors 38,38a as they are being mated during the docking procedure.

Representatively, and based on the assumption that the notebook computer 18 weighs approximately eight pounds, the springs 140 and 148 are sized in a manner such that with the computer 18 removed from the platform 122 the spring 140 has a compressive preload force thereon of approximately 3.5 pounds, and the spring 148 has a compressive preload force thereon of approximately four pounds.

As illustrated in FIG. 1, arcuate cutout areas 154 and 156 are respectively formed in the stand structure base portion 56 beneath a front end portion of the top side recess 68, and in a top side portion of the transverse lower end portion 120 of the holding wall structure 70 immediately behind the rear end of the platform 122. Cutout area 154 forms beneath the vertically supported docking station a flow discharge opening for a speaker portion of the docking station (not visible in the drawings), and cutout area 156 forms an air flow discharge opening for a cooling fan portion of the vertically supported docking station (also not visible in the drawings).

In summary, as can readily be seen from the foregoing, the specially designed stand structure 14 of the present invention both vertically supports the docking station 12 and serves to horizontally and vertically align the docking station and computer connectors 38,38a using the resiliently supported platform 122 and the horizontal width-adjustable vertical holding wall structure 70. Due to its configuration and relationship with the docking station that it vertically supports, the stand structure 14 permits the portable computer 18 to be either vertically or horizontally inserted into the gap between the docking station guide portion 24 and the pivotally mounted outer wall portion 72. Moreover, the horizontal adjustment capability of the adjustment member 88, coupled with the automatic pivoting of the vertical portion of the wall structure 70 into engagement with the computer in response to placement of the computer 18 on the receiving platform 122, assures that vertically oriented notebook computers of varying horizontal widths will be slidingly held against the docking station guide portion 24 to create and preserve horizontal alignment between the computer and docking connector portions during horizontally rearward docking movement of the computer.

The foregoing detailed description is to be clearly understood as being given by way of illustration and example only, the spirit and scope of the present invention being limited solely by the appended claims.

What is claimed is:

1. Computer docking apparatus comprising a stand structure configured to support a computer docking station of the type having an electrical connector and a guide structure along which a portable computer may be moved into docked coupling with the electrical connector, said stand structure having:

a receiving portion upon which a portable computer may be placed; and a holding portion movable in response to placement of the portable computer on said receiving portion to engage the portable computer and hold the portable computer against the docking station guide structure for movement therealong into docked coupling with the electrical connector.

2. The computer docking apparatus of claim 1 further comprising a computer docking station operatively supportable by said stand structure and having an electrical connector and a guide structure along which a portable computer may be moved into docked coupling with the electrical connector.

3. The computer docking apparatus of claim 2 further comprising a portable computer placeable on said receiving portion and being engageable by said holding portion and movable along said guide structure into docked coupling with said electrical connector.

4. The computer docking apparatus of claim 3 wherein said portable computer is a notebook computer.

5. The computer docking apparatus of claim 1 further comprising a portable computer placeable on said receiving portion.

6. The computer docking apparatus of claim 5 wherein said portable computer is a notebook computer.

7. The computer docking apparatus of claim 1 wherein said holding portion and said receiving portion are supported on the balance of said stand structure for conjoint rotation relative thereto in response to placement of the portable computer on said receiving portion.

8. The computer docking apparatus of claim 1 wherein said receiving portion has a resiliently supported deflectable platform member upon which the portable computer may be placed.

9. The computer docking apparatus of claim 1 wherein said holding portion includes a wall structure having an inner side positioned to face the portable computer, and an adjustment member carried by said wall structure and being releasably lockable thereon to project a selectively variable distance outwardly beyond said inner side to engage the portable computer during movement of said holding portion in response to placement of the portable computer on said receiving portion.

10. A method of docking a portable computer having a first docking connector, said method comprising the steps of:

providing a docking station with a second docking connector and a guide structure;

providing a stand structure with a holding portion and a receiving portion;

supporting said docking station on said stand structure;

placing the portable computer on said receiving portion;

causing said holding portion to move toward and engage the portable computer, in a manner holding the portable computer against said guide structure, in response to placement of the portable computer on said receiving portion; and releasably mating the first and second docking connectors by moving the portable computer along said guide structure.

11. The method of claim 10 wherein said releasably mating step is performed by horizontally moving the portable computer along said guide structure.

12. The method of claim 10 wherein said holding portion is a generally vertically extending wall structure, and said causing step is performed by causing said wall structure to pivot toward said guide structure on the docking station, about a horizontal axis, in response to placement of the portable computer on said receiving portion.

13. The method of claim 12 wherein said generally vertically extending wall structure is pivotable toward said guide structure of the supported docking station to a support position, and pivotable away from said guide structure to a receiving position, said receiving portion is anchored to said wall structure for pivotal motion therewith, extends transversely from a lower portion thereof toward said guide structure, and has a top side, and said placing step is performed by placing the portable computer on said top side and permitting the weight of the portable computer to pivot said wall structure from said receiving position thereof to said support position thereof.

14. The method of claim 10 wherein said stand structure has a top side recess configured to complementarily receive a side portion of said docking station extending generally transversely to said bottom side thereof, and said supporting step includes the step of placing said side portion of said docking station into said top side recess.

15. The method of claim 10 wherein said holding portion has an adjustment portion movable relative to the balance thereof, toward the guide structure of the supported docking station, to selectively vary the minimum distance in a first direction between said holding portion and said guide structure, and said method further comprises the step of moving said adjustment member relative to the balance of said holding portion in a manner making said minimum distance substantially equal to the thickness in said first direction of the portable computer.

16. Computer docking apparatus comprising a stand structure for use with a docking station having a an electrical connector, and a guide structure along which a portable computer may be moved into docked coupling with the electrical connector, said stand structure including:

a base portion configured to operatively support the docking station;

a holding structure secured to said base portion for pivotal movement relative thereto toward the guide structure of the docking station to a support position in which said holding structure faces the guide structure in a spaced apart relationship therewith, and away from the guide structure to a receiving position, and a receiving structure, upon which a portable computer may be placed, said receiving structure being secured to said holding structure for pivotal motion therewith relative to said base portion and being operative, in response to placement of the portable computer thereon when said holding structure is in said receiving position, to forcibly pivot said holding structure from said receiving position thereof to said support position thereof in a manner permitting said holding structure to engage the portable computer and hold the portable computer against the guide structure of the docking station to facilitate the movement of the portable computer therealong into docked coupling with the docking station electrical connector.

17. The computer docking apparatus of claim 16 further comprising a spring interconnected between said receiving structure and said base portion and operative to resiliently bias said holding structure toward said receiving position thereof.

18. The computer docking apparatus of claim 16 wherein said receiving structure includes a vertically movable top side platform portion atop which the oriented portable computer may be placed, and a spring resiliently and upwardly biasing said platform portion toward an upper limit position thereof.

19. The computer docking apparatus of claim 16 wherein said stand structure base portion has a top side recess formed therein and configured to complementarily receive a side portion of the docking station generally transverse to its bottom side.

20. The computer docking apparatus of claim 19 wherein said top side recess has a generally L-shaped configuration.

21. The computer docking apparatus of claim 16 wherein said holding structure includes a holding wall having an inner side positioned to face the guide structure of the supported docking station, and an adjustment structure having a portion movable relative to said holding wall to a releasably locked position in which said adjustment structure portion projects a selectively variable distance outwardly beyond said inner side of said holding wall.

22. The computer docking apparatus of claim 21 wherein said holding wall is hollow and has an opening in said inner side thereof, and said adjustment structure includes an adjustment member disposed in said hollow holding wall and having a curved side surface portion, and a support structure disposed within said hollow holding wall and supporting said adjustment member for movement relative thereto to cause said curved side surface portion to move through said opening to position said curved side surface a selectively variable distance outwardly beyond said inner side of said holding wall.

23. The computer docking apparatus of claim 22 wherein said adjustment member has an upper end, said curved side surface portion is on a lower end portion of said adjustment member, said lower end portion of said adjustment member has a pair of oppositely projecting mounting pin portions, and said support structure disposed within said hollow holding wall includes an arcuate surface against which said upper end of said adjustment member slidably bears, a spaced pair of stairstepped series of notches formed in the interior of said hollow holding wall having opposed notch pairs configured to removably receive said mounting pin portions, and a spring structure bearing against said adjustment member and resiliently and releasably holding its mounting pin portions in one of said notch pairs.

24. The computer docking apparatus of claim 16 further comprising a computer docking station operatively supportable by said stand structure base portion and having an electrical connector and a guide structure along which a portable computer may be moved into docked coupling with the electrical connector.

25. The computer docking apparatus of claim 24 further comprising a portable computer placeable on said receiving structure and being engageable by said holding structure and movable along said guide structure into docked coupling with said electrical connector.

26. The computer docking apparatus of claim 25 wherein said portable computer is a notebook computer.

27. The computer docking apparatus of claim 16 further comprising a portable computer placeable on said receiving structure.

28. The computer docking apparatus of claim 27 wherein said portable computer is a notebook computer.

* * * * *